(12) United States Patent
Asakura et al.

(10) Patent No.: US 12,452,356 B2
(45) Date of Patent: Oct. 21, 2025

(54) COMMUNICATION APPARATUS, METHOD, AND PROGRAM HAVING A SIGNAL STRENGTH COMPASS

(71) Applicant: Sony Group Corporation, Tokyo (JP)

(72) Inventors: Kenta Asakura, Tokyo (JP); Jungo Goto, Tokyo (JP); Tomoyuki Nishikawa, Tokyo (JP); Masato Yabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 485 days.

(21) Appl. No.: 17/920,022

(22) PCT Filed: May 11, 2020

(86) PCT No.: PCT/JP2020/018847
§ 371 (c)(1),
(2) Date: Oct. 20, 2022

(87) PCT Pub. No.: WO2021/229650
PCT Pub. Date: Nov. 18, 2021

(65) Prior Publication Data
US 2023/0164260 A1 May 25, 2023

(51) Int. Cl.
*H04M 1/247* (2021.01)
*H04M 1/72454* (2021.01)

(52) U.S. Cl.
CPC ....... *H04M 1/247* (2013.01); *H04M 1/72454* (2021.01)

(58) Field of Classification Search
CPC .................................................. H04M 1/247
(Continued)

(56) References Cited

U.S. PATENT DOCUMENTS 7,365,706 B2 * 4/2008 Shimoyama .......... G06T 19/006
348/E5.022
10,083,639 B2 * 9/2018 Kimura ................ G02B 27/017
(Continued)

FOREIGN PATENT DOCUMENTS

EP  3570464 A1  11/2019
JP  2004-258029 A  9/2004
(Continued)

OTHER PUBLICATIONS

J. C. D. Cruz et al., "Faculty Monitoring System with Mobile Application Using Received Signal Strength Indication," 2018 IEEE 10th International Conference on Humanoid, Nanotechnology, Information Technology,Communication and Control, Environment and Management (HNICEM), 2018 (Year: 2018).*

(Continued)

*Primary Examiner* — William D Cumming
(74) *Attorney, Agent, or Firm* — XSENSUS LLP

(57) ABSTRACT

Provided is a communication apparatus including a determination unit that determines a direction in which the communication apparatus faces, a measurement unit that measures signal strength indicating strength of a radio wave received by the communication apparatus, a notification unit that notifies a user of the signal strength falling below a first threshold, and a display unit that superimposes a direction in which the signal strength exceeds a second threshold, as first display, on second display being displayed. This configuration makes it possible to guide the user to turn in a direction in which high signal strength is received, without hindering UX of the user of the communication apparatus using a high frequency band as much as possible.

7 Claims, 10 Drawing Sheets

(58) Field of Classification Search
USPC .......................................................... 455/566
See application file for complete search history.

(56) References Cited

U.S. PATENT DOCUMENTS

| | | | | |
|---|---|---|---|---|
| 11,068,699 | B2* | 7/2021 | Kimura | G06T 1/00 |
| 11,082,608 | B2* | 8/2021 | Ogawa | H04N 23/675 |
| 11,189,205 | B2* | 11/2021 | Yamamoto | A41B 1/08 |
| 11,330,156 | B2* | 5/2022 | Sato | G03B 19/12 |
| 11,337,025 | B2* | 5/2022 | Takase | A63F 13/54 |
| 11,662,815 | B2* | 5/2023 | Lam | G06F 1/163 345/156 |
| 11,835,727 | B2* | 12/2023 | Kondo | G06V 40/19 |
| 11,908,055 | B2* | 2/2024 | Saito | G06F 3/011 |
| 12,175,688 | B2* | 12/2024 | Menozzi | G01C 21/1654 |
| 12,190,579 | B2* | 1/2025 | Gotoh | G06F 3/012 |
| 2006/0128450 | A1 | 6/2006 | Oda | |
| 2012/0088452 | A1 | 4/2012 | Jørgensen | |
| 2016/0147293 | A1* | 5/2016 | Park | G06F 1/1694 381/334 |
| 2017/0046019 | A1* | 2/2017 | Hasegawa | G06F 3/04817 |
| 2017/0120819 | A1* | 5/2017 | Arita | G08G 1/096758 |
| 2019/0014256 | A1* | 1/2019 | Ogawa | H04N 23/631 |
| 2019/0052798 | A1* | 2/2019 | Yokokawa | H04N 23/65 |
| 2020/0007209 | A1* | 1/2020 | Kang | H04B 7/0695 |
| 2020/0227007 | A1* | 7/2020 | Oi | H04N 13/139 |
| 2021/0151287 | A1* | 5/2021 | Hyde | H01J 37/28 |
| 2021/0211827 | A1* | 7/2021 | Takase | H04S 7/302 |
| 2022/0091809 | A1* | 3/2022 | Nagano | G06F 3/04845 |
| 2022/0166917 | A1* | 5/2022 | Tsurumi | H04N 23/62 |
| 2022/0180583 | A1* | 6/2022 | Saito | G10L 15/22 |
| 2022/0221872 | A1* | 7/2022 | Oi | G05D 1/0214 |
| 2022/0317462 | A1* | 10/2022 | Kondo | G06F 3/016 |
| 2023/0112539 | A1* | 4/2023 | Lam | G06F 1/163 345/156 |
| 2023/0164260 | A1* | 5/2023 | Asakura | H04M 1/247 455/566 |
| 2023/0259207 | A1* | 8/2023 | Lam | G06F 3/017 345/156 |
| 2023/0341936 | A1* | 10/2023 | Inoue | G06F 3/0325 |
| 2023/0341987 | A1* | 10/2023 | Sakai | G06F 3/04845 |
| 2023/0404532 | A1* | 12/2023 | Koshino | A61B 8/464 |
| 2025/0037457 | A1* | 1/2025 | Gotoh | G06T 7/11 |
| 2025/0093955 | A1* | 3/2025 | Yamano | G06F 3/01 |

FOREIGN PATENT DOCUMENTS

| | | |
|---|---|---|
| JP | 2005-151483 A | 6/2005 |
| JP | 2006-157774 A | 6/2006 |
| JP | 2017-34635 A | 2/2017 |
| JP | 2019-213747 A | 12/2019 |
| WO | WO-2005094110 A1 | 10/2005 |
| WO | 2013/094110 A1 | 6/2013 |

OTHER PUBLICATIONS

International Search Report and Written Opinion mailed on Jul. 14, 2020, received for PCT Application PCT/JP2020/018847, filed on May 11, 2020, 11 pages including English Translation.

* cited by examiner

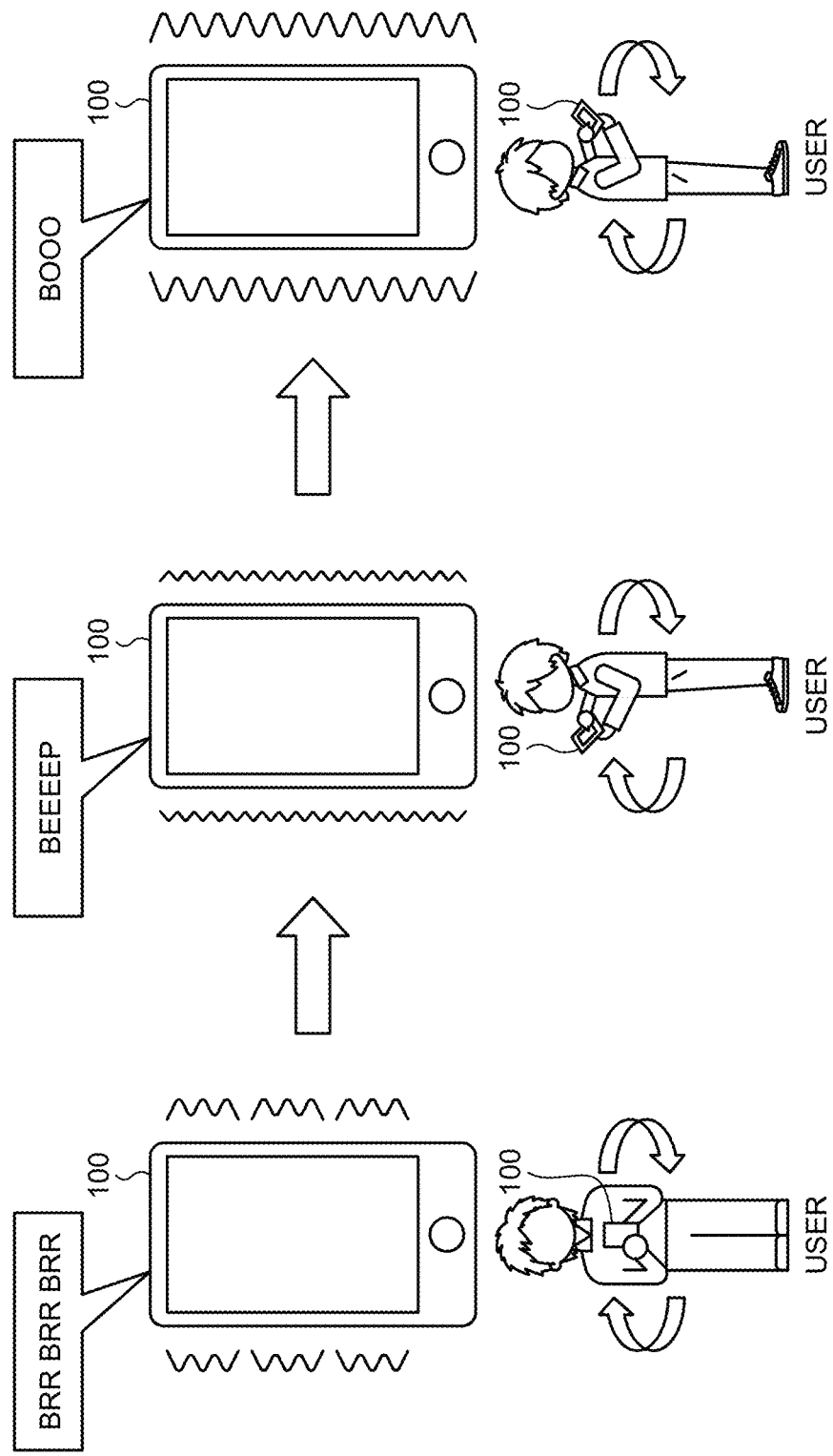

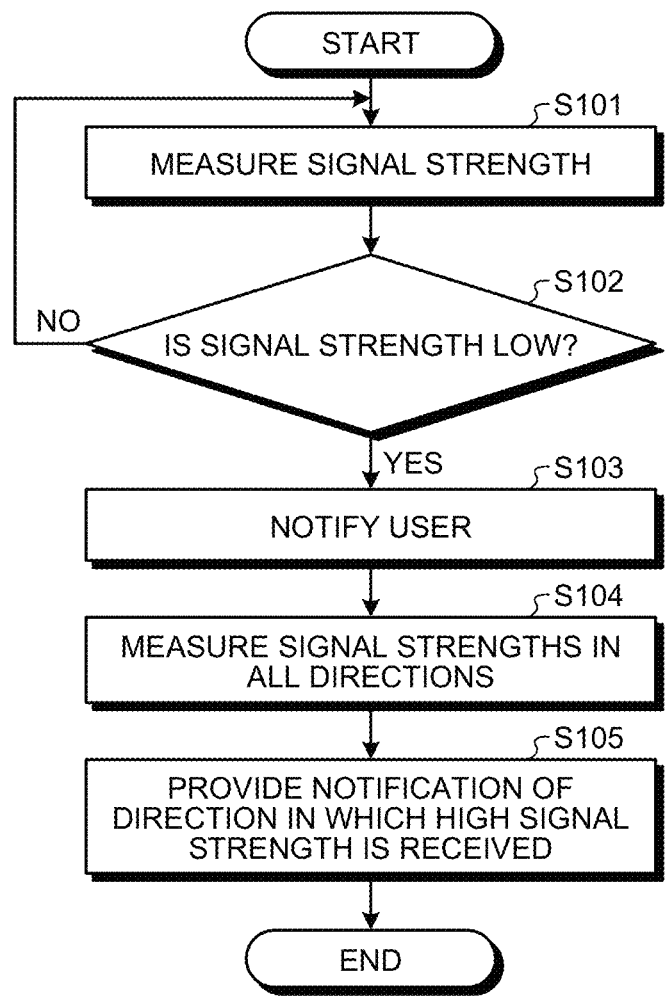

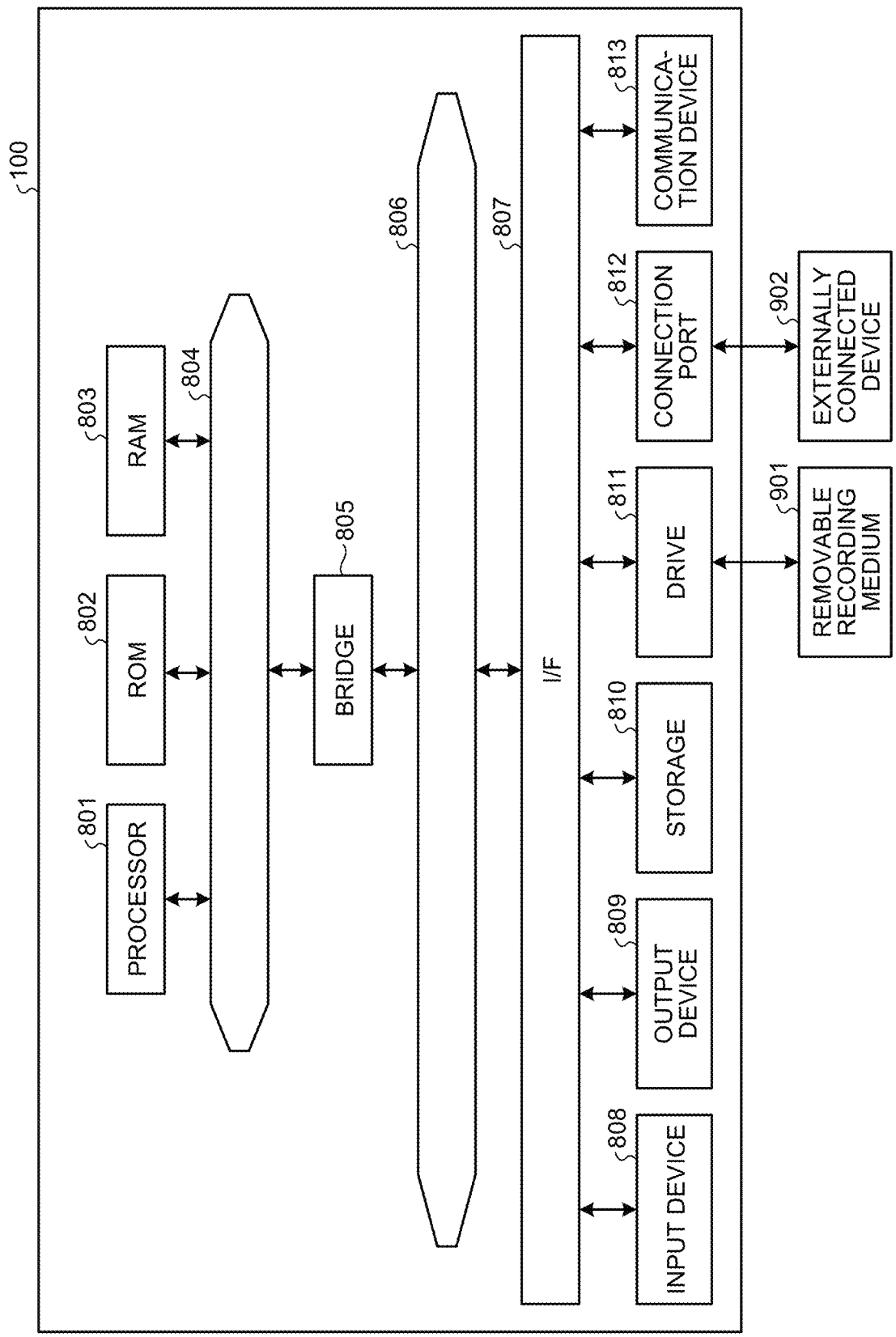

COMMUNICATION APPARATUS, METHOD, AND PROGRAM HAVING A SIGNAL STRENGTH COMPASS

CROSS-REFERENCE TO RELATED APPLICATION

The present application is based on PCT filing PCT/JP2020/018847, filed May 11, 2020, the entire contents of which is incorporated herein by reference.

FIELD

The present disclosure relates to a communication apparatus, a method, and a program.

BACKGROUND

In 5th generation mobile communication system (5G), standardization for large-capacity communication such as for 10 to 20 Gbps using wideband transmission that uses a frequency band (28 GHz) higher than that of 4G (LTE) has proceeded. Centimeter waves or millimeter waves used in such a high frequency band have a short wavelength, achieving an increased capacity of data to be transmitted and a reduced size of antennas.

CITATION LIST

Patent Literature

Patent Literature 1: JP 2019-213747 A

SUMMARY

Technical Problem

However, the centimeter waves and millimeter waves have highly straight propagation, and are easily affected by an obstruction such as a building, a person, or a vehicle. For example, when a user himself/herself becomes an obstruction between a communication apparatus such as a smartphone supporting 5G and a base station, signal strength is reduced depending on the direction in which the user faces even at the same place, considerably deteriorating communication quality. Therefore, it is necessary to guide the user to turn in a direction in which high signal strength is received.

Meanwhile, depending on a method of guiding the orientation of the user, there is a possibility to hinder, for example, the user experience (UX) of the user who enjoys video distribution, games, or the like on the communication apparatus.

Therefore, the present disclosure proposes a communication apparatus, a method, and a program that are configured to guide a user to turn in a direction in which high signal strength is received, without hindering the UX of the user of the communication apparatus using high frequency band as much as possible.

Solution to Problem

According to the present disclosure, a communication apparatus includes: a determination unit that determines a direction in which the communication apparatus faces; a measurement unit that measures signal strength indicating strength of a radio wave received by the communication apparatus; a notification unit that notifies a user of the signal strength falling below a first threshold; and a display unit that superimposes a direction in which the signal strength exceeds a second threshold, as first display, on second display being displayed.

Moreover, according to the present disclosure, a method includes: by a communication apparatus, determining a direction in which the communication apparatus faces; measuring signal strength indicating strength of a radio wave received by the communication apparatus; notifying a user of the signal strength falling below a first threshold; and superimposing a direction in which the signal strength exceeds a second threshold, as first display, on second display being displayed.

Moreover, according to the present disclosure, a program causes a communication apparatus to perform: determining a direction in which the communication apparatus faces; measuring signal strength indicating strength of a radio wave received by the communication apparatus; notifying a user of the signal strength falling below a first threshold; and superimposing a direction in which the signal strength exceeds a second threshold, as first display, on second display being displayed.

BRIEF DESCRIPTION OF DRAWINGS

FIG. 8 is a diagram illustrating an example of a method of notifying of signal strength by a vibration function according to the embodiment.

FIG. 9 is a flowchart illustrating a process of measurement of the signal strength and display processing, according to the embodiment.

FIG. 10 is a block diagram illustrating an exemplary hardware configuration of the communication apparatus 100 according to the embodiment.

DESCRIPTION OF EMBODIMENTS

Figure 1:
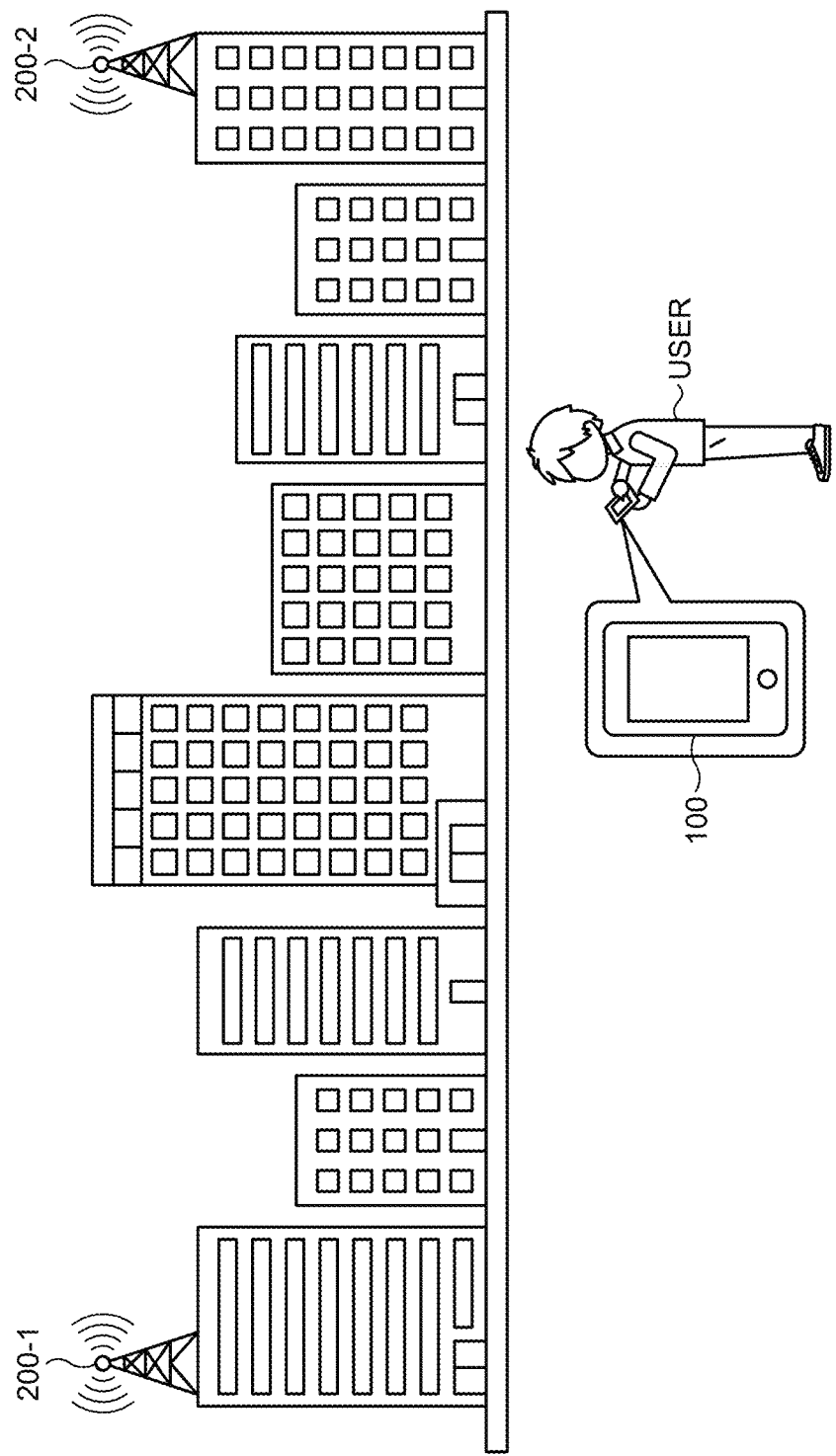
FIG. 1 is a diagram illustrating an example of a communication apparatus 100 according to the present embodiment.

The present embodiment will be described in detail below with reference to the drawings. Note that in the present description and the drawings, substantially the same portions are denoted by the same reference numerals, and redundant description thereof will be omitted.

Note that the description will be given in the following order.

1. Embodiment
1.1. Exemplary functional configuration
1.2. Details of functions
1.3. Functional process
2. Exemplary hardware configuration
3. Conclusion 1. Embodiment <<1.1. Exemplary Functional Configuration>>

A communication apparatus 100 according to the present embodiment will be described first. FIG. 1 is a diagram illustrating an example of the communication apparatus 100 according to the present embodiment. The communication apparatus 100 is a mobile terminal such as a smartphone or a tablet PC carried and used by a user. The communication apparatus 100 is connected to base stations 200-1 and 202-2 (hereinafter, collectively referred to as "base stations 200") by wireless communication.

When a radio wave transmitted by each base station 200 is a radio wave in a high frequency band, the user himself/herself becomes an obstruction to each base station 200, in some cases. For example, when the user stands between the base station 202-2 and the communication apparatus 100, the user may be the obstruction to the base station 202-2. In this case, even if the user stands at a position closer to the base station 202-2 than to the base station 202-1, the base station 200-1 is higher than the base station 200-2 in a strength of the radio wave from each base station 200 received by the communication apparatus 100, in some cases.

However, the radio waves from the base stations 200 are invisible, and the most users do not know where the base stations 200 are installed, thereby not being aware that the orientation of the user causes deterioration in communication quality. Therefore, as a matter of course, the user is not aware that the communication quality can be improved if the user turns in the spot. Therefore, in the present embodiment, the user is guided to turn in a direction in which high signal strength is received.

Figure 2:
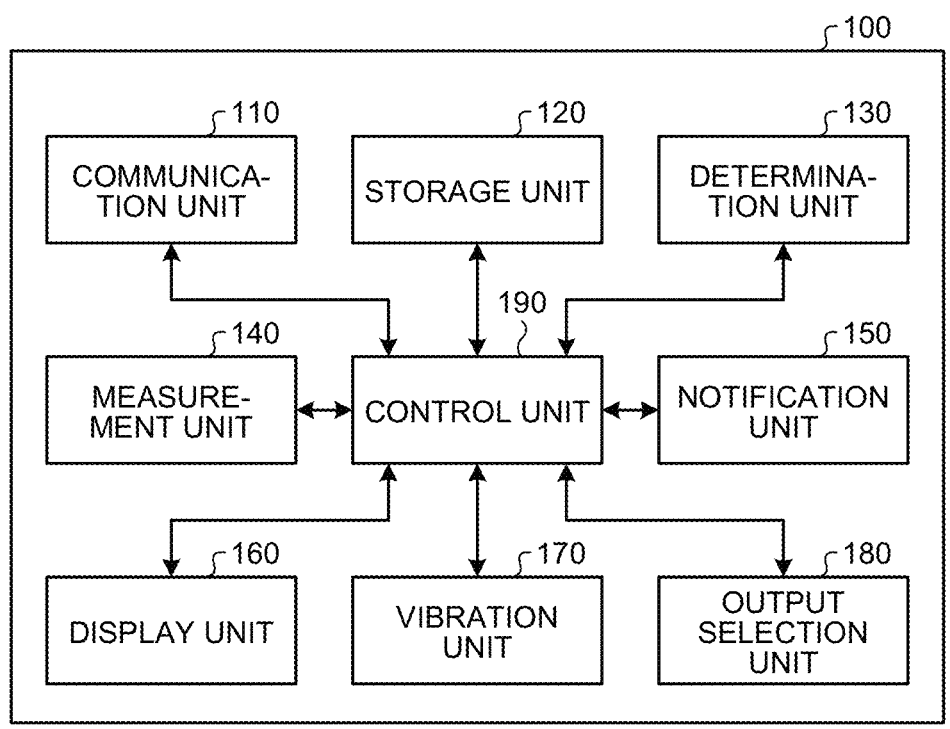
FIG. 2 is a block diagram illustrating an exemplary functional configuration of the communication apparatus 100 according to the embodiment.

Next, an example of the functional configuration of the communication apparatus 100 according to the present embodiment will be described. FIG. 2 is a block diagram illustrating an exemplary functional configuration of the communication apparatus 100 according to the present embodiment. As illustrated in FIG. 2, the communication apparatus 100 according to the present embodiment includes a communication unit 110, a storage unit 120, a determination unit 130, a measurement unit 140, a notification unit 150, a display unit 160, a vibration unit 170, an output selection unit 180, and a control unit 190.

(Communication Unit 110)

The communication unit 110 according to the present embodiment is wirelessly connected to various communication networks such as the Internet, and transmits and receives information to and from the base stations 200, other information processing devices, and the like on the network.

(Storage Unit 120)

The storage unit 120 according to the present embodiment is a storage area for temporarily or permanently storing various programs and data. For example, the storage unit 120 is configured to store programs and data for the communication apparatus 100 to perform various functions. As a specific example, the storage unit 120 may store a program and data for measuring and displaying the signal strength, a user interface (UI), management data for managing various settings and the like. As a matter of course, the above description is merely examples, and the type of data to be stored in the storage unit 120 is not particularly limited.

(Determination Unit 130)

The determination unit 130 according to the present embodiment determines a direction (orientation) in which the communication apparatus 100 is facing. Therefore, the determination unit 130 includes, for example, a magnetic sensor. Furthermore, the determination unit 130 is configured to include an acceleration sensor and a gyro sensor, and is also configured to determine the inclination and rotation direction of the communication apparatus 100 on the basis of acceleration and angular velocity measured by various sensors.

(Measurement Unit 140)

The measurement unit 140 according to the present embodiment measures the strength of the radio wave (signal strength) received by the communication unit 110. The measurement unit 140 continues to measure the signal strength, but may change a measurement interval according to the change of the direction in which the communication apparatus 100 is facing, determined by the determination unit 130. For example, in a case where it can be determined that the user turns in the spot to measure the signal strength on the basis of the change of the direction in which the communication apparatus 100 is facing, the measurement interval of the measurement unit 140 can be further reduced. Furthermore, in this case, when it can be determined, on the basis of the change of the direction in which the communication apparatus 100 faces, that the turning of the user is stopped and the measurement of the signal strength is finished, the measurement interval of the measurement unit 140 can be returned to the original measurement interval.

(Notification Unit 150)

The notification unit 150 according to the present embodiment is configured so that when the signal strength measured by the measurement unit 140 falls below a predetermined threshold (corresponding to "first threshold"), the user is notified of the signal strength. Although a method of notifying the user will be described later, the notification unit 150 is configured to notify the user by, for example, displaying a signal strength indicator 300 for displaying the signal strength, outputting a predetermined message in text or by sound, outputting a sound or vibration with a specific pattern, or blinking LED light.

(Display Unit 160)

The display unit 160 according to the present embodiment displays various visual information under the control of the control unit 190. The display unit 160 may display, for example, an image, characters, or the like related to the application. Therefore, the display unit 160 according to the present embodiment includes various display devices such as a liquid crystal display (LCD) device and an organic light emitting diode (OLED) display device.

Furthermore, when the signal strength measured by the measurement unit 140 exceeds a predetermined threshold (corresponding to "second threshold"), the display unit 160 superimposes a direction in which the signal strength exceeds the predetermined threshold (corresponding to "first display"), on a display on the display unit 160 (e.g., display of any application, corresponding to "second display"). In addition, the display unit 160 displays a direction in which the measurement of the signal strength by the measurement unit 140 is completed.

In addition, the display unit 160 is configured to hide the first display described above, on the basis of an elapsed time, such as passage of a certain time period in which the communication apparatus 100 is kept facing in a direction in which the signal strength measured by the measurement unit 140 exceeds the predetermined threshold (corresponding to the "second threshold").

In addition, the display unit 160 is configured to display the direction in which the signal strength exceeds the predetermined threshold, at a display position set in advance by the user. Note that the display position is allowed to be set for each application. Furthermore, the display position may be determined in advance depending on the type of application (classification such as video viewing application, game, browsing, etc.). In addition, when a predetermined application is being used, the display position may be adjusted by automatically determining a position where drawing is updated less frequently. Therefore, it is possible to change the display position of the first display described above, for each application being displayed on the display unit 160, suppressing hindrance of the UX of the user of the communication apparatus 100.

(Vibration Unit 170)

The vibration unit 170 according to the present embodiment vibrates by changing at least one of the strength and pattern of vibration depending on the signal strength received by the communication unit 110.

(Output Selection Unit 180)

The output selection unit 180 according to the present embodiment selectively determines, on the basis of an application being displayed on the display unit 160, whether to output notification of the signal strength to the user through the first display by the display unit 160, described above, or through the vibration by the vibration unit 170. This configuration makes it possible to selectively use the display, the vibration, or both thereof to notify the user of the signal strength, for each application being used with displayed on the display unit 160, suppressing hindrance of the UX of the user of the communication apparatus 100.

(Control Unit 190)

The control unit 190 according to the present embodiment controls each configuration of the communication apparatus 100. In addition to the control of each configuration, the control unit 190 is configured to control, for example, each application displayed on the display unit 160.

The exemplary functional configuration of the communication apparatus 100 according to the present embodiment has been described. Note that the functional configuration described above with reference to FIG. 2 is merely an example, and the functional configuration of the communication apparatus 100 according to the present embodiment is not limited to such an example. For example, the communication apparatus 100 may not necessarily include all of the configurations illustrated in FIG. 2. The functional configuration of the communication apparatus 100 according to the present embodiment can be flexibly modified according to specifications and operations.

In addition, an arithmetic device such as a central processing unit (CPU) may perform the function of each component element by reading a control program from a storage medium such as a read only memory (ROM) or a random access memory (RAM) storing control programs in which process procedures to implement the functions of the component elements are described, and by interpreting and performing the program. Therefore, it is possible to appropriately change the configuration to be used, according to technical level whenever the present embodiment is carried out. Furthermore, an example of a hardware configuration of the communication apparatus 100 will be described later.

<<1.2. Details of Functions>>

Next, functions of the communication apparatus 100 according to the present embodiment will be described in detail. The communication apparatus 100 according to the present embodiment guides the user to turn in the direction in which high signal strength is received. As a specific method of guiding the user, the communication apparatus 100 measures the signal strength in a direction in which the communication apparatus 100 faces, and displays the measured signal strength via the signal strength indicator 300.

Figure 3:
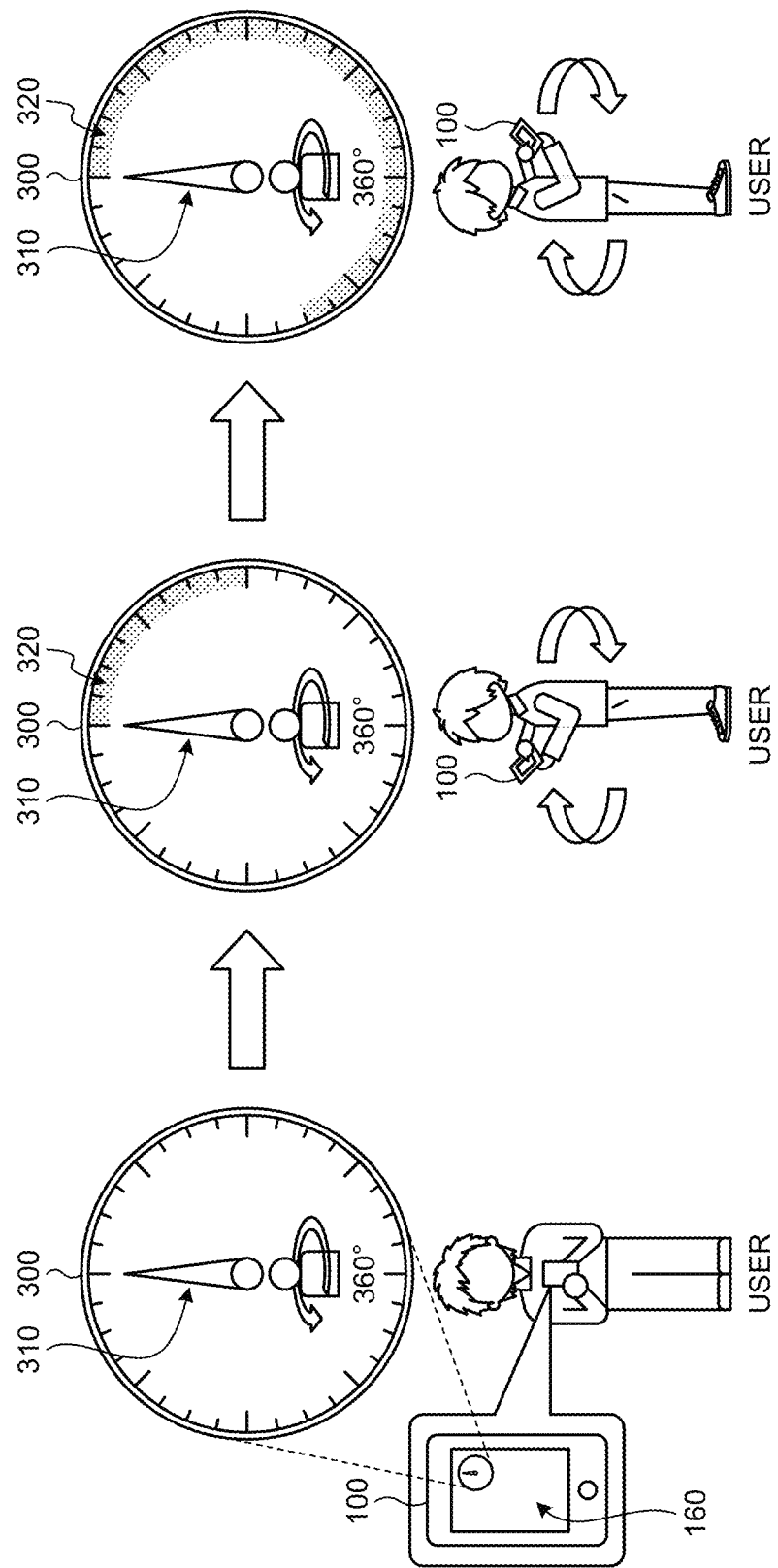
FIG. 3 is a diagram illustrating a display example of a signal strength indicator 300 being measuring signal strength, according to the embodiment.

FIG. 3 is a diagram illustrating a display example of the signal strength indicator 300 being measuring signal strength, according to the embodiment. The signal strength indicator 300 is configured to be displayed on the display unit 160, for example, when the signal strength received and measured by the communication apparatus 100 falls below the predetermined threshold (corresponding to the "first threshold"). On the left side of FIG. 3, states of the signal strength indicator 300 and the user, at the beginning of the measurement of the signal strength are illustrated. In the signal strength indicator 300, for example, a direction in which the user is facing is indicated by an arrow 310 through 360° around the user.

In the example illustrated on the left side of FIG. 3, the user holds the communication apparatus 100 facing in an appropriate direction, and the signal strength indicator 300 is displayed on the display unit 160. Then, when the user turns clockwise or counterclockwise in the spot, the signal strength in a direction in which the communication apparatus 100 faces is measured.

In the center of FIG. 3, states of the signal strength indicator 300 and the user, during the measurement of the signal strength are illustrated. As illustrated in the center of FIG. 3, when the user turns 90° clockwise (or counterclockwise) in the spot from the state at the beginning of measurement, the communication apparatus 100 measures the signal strength during the 90° turning. In this case, as illustrated in the center of FIG. 3, a measurement completion range 320 is displayed on the signal strength indicator 300 so that the direction in which the measurement of the signal strength is completed can be visually recognized. Then, when the user further continues to turn in the spot, the direction in which the measurement of the signal strength is completed increases, and the measurement completion range 320 that increases as the measurement is completed is displayed, as illustrated on the right side of FIG. 3.

Figure 4:
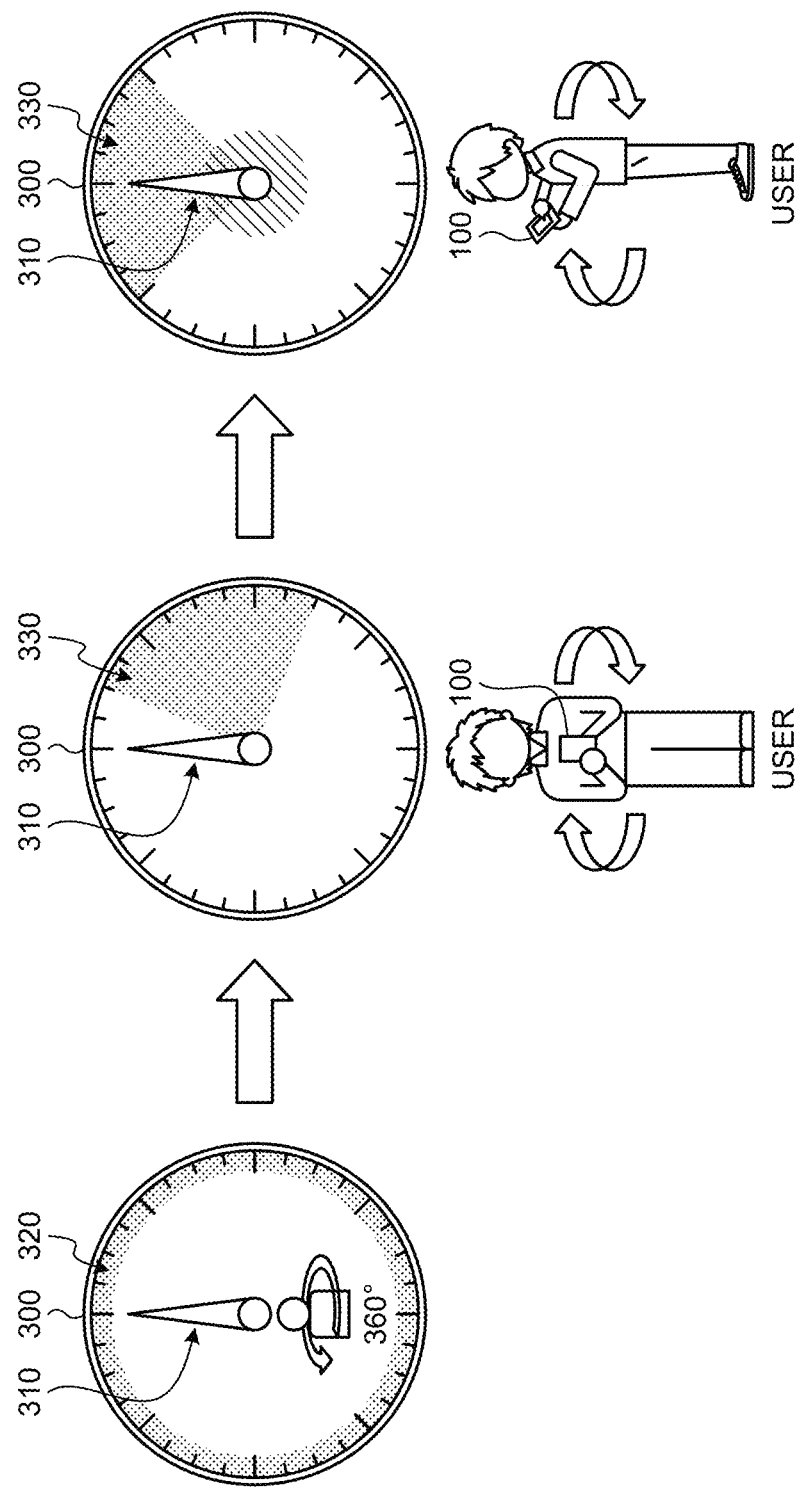
FIG. 4 is a diagram illustrating a display example of the signal strength indicator 300 upon completion of the measurement of the signal strength, according to the embodiment.

Next, display of the signal strength indicator 300 will be described, where the user has turned round in the spot and the measurement of the signal strength has been completed in all directions. FIG. 4 is a diagram illustrating a display example of the signal strength indicator 300 upon completion of the measurement of the signal strength, according to the present embodiment. On the left side of FIG. 4, a display example of the signal strength indicator 300 upon completion of the measurement of the signal strength in all directions is illustrated. In this case, as illustrated on the left side of FIG. 4, the measurement completion range 320 is displayed through all directions.

Note that the measurement of the signal strength in all directions does not necessarily require measurement in all directions, and may be measurement, for example, in four directions of east, west, north, and south, or in only two directions of a direction in which the communication apparatus 100 faces at the start of measurement and a direction opposite to the direction by 180°. However, the limitation of the directions in which the signal strength is measured as described above reduces the granularity (e.g., fineness in a direction indicated as a direction in which high signal strength is received) of a result of the measurement. In addition, a learning model that is trained by training data having an input of results of the measurement (e.g., a direction for which the measurement is performed and the signal strength thereof) and having a correct output of the direction in which high signal strength is received may be used to estimate the direction in which high signal strength is received from the signal strength measured in a certain direction, not all direction.

When the measurement of the signal strength is completed, the direction in which high signal strength is received is displayed as a high-strength range 330, as illustrated in the center of FIG. 4. In the example illustrated in the center of FIG. 4, the high-strength range 330 concentrates into a single location, but may disperses into a plurality of locations. Note that the high-strength range 330 may indicate a direction in which the signal strength is equal to or more than the predetermined threshold, or may indicate a direction in which higher signal strength is received, from among all directions measured.

Furthermore, the threshold may be a fixed value, or may be dynamically set referring to a surrounding radio wave environment. Alternatively, the threshold may be determined for each application being used on the communication apparatus 100. This is because the communication quality required at that time differs depending on the application being used. For example, in a case where the application being used on the communication apparatus 100 is a video distribution application or the like requiring a large communication volume, a certain level of high communication quality is required, and thus the threshold is also determined to be higher. Meanwhile, in a case where the application being used on the communication apparatus 100 is a mail application, chat application, or the like requiring a low communication volume, the high communication quality as required in the above is not required, and thus the threshold is determined to be lower.

As illustrated in the center and on the right side of FIG. 4, when the high-strength range 330 is displayed on the signal strength indicator 300, the user turns in the spot so that the communication apparatus 100 faces in the direction in which high signal strength is received (so that the arrow 310 falls within the high-strength range 330. Therefore, the user can turn in the direction in which high signal strength is received. Note that as illustrated on the right side of FIG. 4, when a certain period of time has passed while the arrow 310 remains within the high-strength range 330, the signal strength indicator 300 can be hidden.

Note that the display forms such as the shapes, colors, sizes, and transparencies of the signal strength indicator 300, the arrow 310, the measurement completion range 320, and the high-strength range 330 illustrated in FIGS. 3 and 4 are merely examples, and are not limited to the examples in FIGS. 3 and 4.

Figure 5:
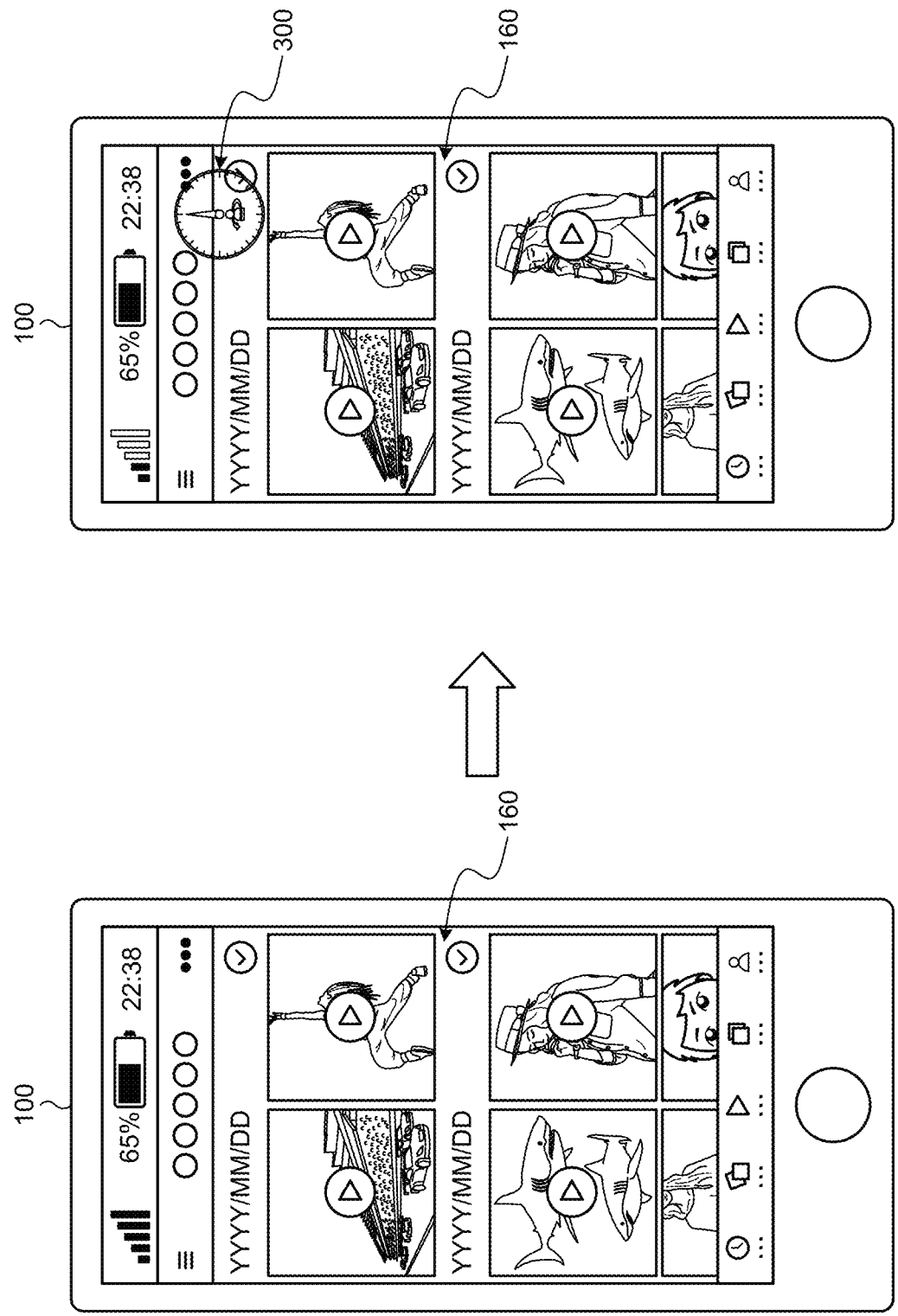
FIG. 5 is a diagram illustrating an example of superimposed display of the signal strength indicator 300 during a portrait mode, according to the embodiment.

Next, superimposed display of the signal strength indicator 300 will be described. FIG. 5 is a diagram illustrating an example of superimposed display of the signal strength indicator 300 during a portrait mode, according to the present embodiment. The example illustrated on the left side of FIG. 5 shows a state in which the communication apparatus 100 is in the portrait mode (so-called vertical holding) and an application is being used with displayed on the display unit 160.

For example, when the signal strength falls below the predetermined threshold in this state, the signal strength indicator 300 is displayed as illustrated on the right side of FIG. 5. At this time, the signal strength indicator 300 is superimposed on the application being displayed on the display unit 160. Furthermore, the signal strength indicator 300 can also be displayed by a predetermined user operation (e.g., double tap operation at a predetermined position). This configuration makes it possible for the user to search for a direction in which higher signal strength is received, even if the signal strength does not fall below the predetermined threshold.

Note that the display position of the signal strength indicator 300 is configured to be changed to any position as described later. In addition, as described above, when the certain period of time has passed while the communication apparatus 100 is kept facing in the direction in which high signal strength is received, the signal strength indicator 300 can be hidden. Alternatively, the signal strength indicator 300 can be hidden by a user operation (e.g., long tap or flick operation on the signal strength indicator 300).

Figure 6:
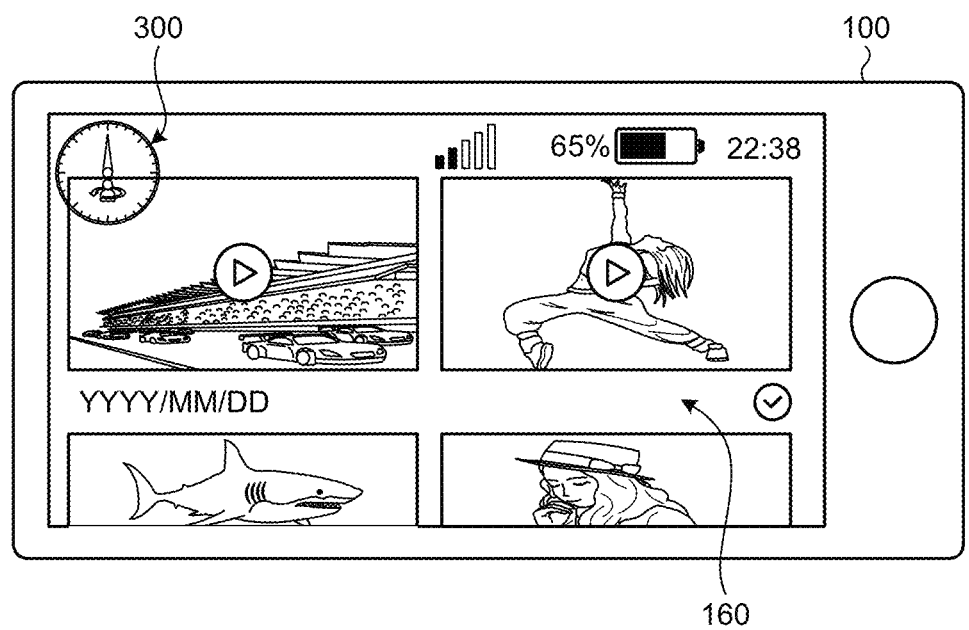
FIG. 6 is a diagram illustrating an example of superimposed display of the signal strength indicator 300 during a landscape mode, according to the embodiment.

In addition, the signal strength indicator 300 in a landscape mode (so-called horizontal holding) of the communication apparatus 100 is also displayed as in the portrait mode. FIG. 6 is a diagram illustrating an example of superimposed display of the signal strength indicator 300 during the landscape mode, according to the present embodiment. The display position of the signal strength indicator 300 can be changed between the landscape mode and the portrait mode. Therefore, for example, when the communication apparatus 100 is switched from the portrait mode to the landscape mode, the display position of the signal strength indicator 300 can also be switched depending on the display on the display unit 160.

Figure 7:
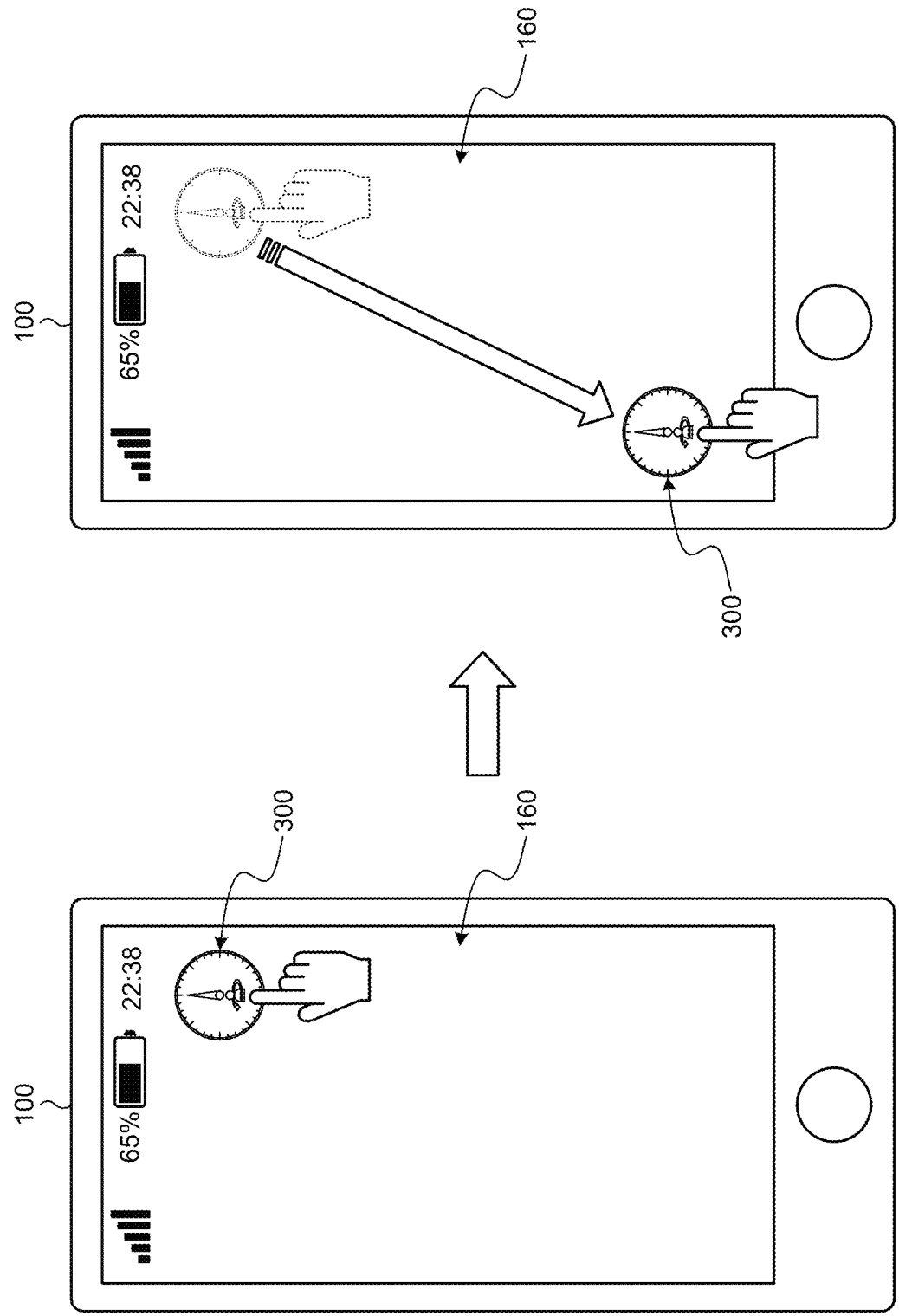
FIG. 7 is a diagram illustrating an example of changing a display position of the signal strength indicator 300 according to the embodiment.

Next, changing the display position of the signal strength indicator 300 will be described. FIG. 7 is a diagram illustrating an example of changing the display position of the signal strength indicator 300 according to the present embodiment. For example, the user performs a tap operation on the signal strength indicator 300 as illustrated on the left side of FIG. 7. Then, as illustrated on the right side of FIG. 7, the display position of the signal strength indicator 300 can be changed by performing a drag-and-drop operation to transfer the signal strength indicator 300 to a position to which the signal strength indicator 300 is desired to be moved. Note that changing the position of the indicator by the drag-and-drop operation is merely an example, and the display position of the signal strength indicator 300 can also be changed to any position by another operation such as a tap operation or flick operation.

Note that the display position is stored in the storage unit 120 of the communication apparatus 100, and for subsequent display of the signal strength indicator 300, the signal strength indicator 300 is displayed at the changed display position. In addition, the display position of the signal strength indicator 300 can be stored for each application used with displayed on the display unit 160. Furthermore, the display position of the signal strength indicator 300 can be stored for each display format of the display unit 160, that is, the portrait mode or the landscape mode. Furthermore, the user can also perform, for example, a pinch in/out operation for the signal strength indicator 300 to appropriately change the size of the signal strength indicator 300. As described above, displaying the signal strength indicator 300 makes it possible for the user to freely customize the display of the signal strength indicator 300 so as not to obstruct the UX of the user of the communication apparatus 100 as much as possible.

In addition, some users may not desire to display the signal strength indicator 300 or for some applications being used on the communication apparatus 100, the display of the signal strength indicator 300 may be not desired. In this case, the user can be notified of the signal strength by vibrations caused by a vibration function. FIG. 8 is a diagram illustrating an example of the method of notifying of the signal strength by the vibration function according to the present embodiment.

In the example illustrated on the left side of FIG. 8, the user holds the communication apparatus 100 facing in an appropriate direction. When the signal strength received and measured by the communication apparatus 100 falls below the predetermined threshold, the vibration unit 170 vibrates in a specific pattern to notify the user that the signal strength has decreased. Therefore, when the user turns clockwise or counterclockwise in the spot, the signal strength in a direction in which the communication apparatus 100 faces is measured.

The center of FIG. 8 shows that the user turns in the spot and the communication apparatus 100 faces in a direction in which low signal strength is received. In this case, the vibration unit 170 vibrates weakly to notify the user that the user is facing in the direction in which low signal strength is received.

The right side of FIG. 8 shows that the user turns in the spot and the communication apparatus 100 faces in a direction in which high signal strength is received. In this case, the vibration unit 170 vibrates strongly to notify the user that the user is facing in the direction in which high signal strength is received.

Note that the example illustrated in FIG. 8 is merely an example, and the vibration unit 170 can vibrate strongly when the communication apparatus 100 is facing in the direction in which low signal strength is received, or the vibration unit 170 can vibrate weakly (i.e., the vibrations are opposite in magnitude to those in the example illustrated in FIG. 8) when the communication apparatus 100 faces in the direction in which high signal strength is received. Furthermore, the vibration unit 170 can vibrate by changing not only the strength of vibration but also the vibration pattern depending on the level of the signal strength.

Furthermore, the method of notifying of the signal strength by the vibration function as illustrated in FIG. 8 can be used in combination with a method of notifying of the signal strength by the signal strength indicator 300. In other words, the communication apparatus 100 is configured to notify the user of the direction in which high signal strength is received by vibration caused by the vibration function while displaying the signal strength indicator 300. Note that whether notification of the signal strength to the user is output by the signal strength indicator 300, by the vibration function as illustrated in FIG. 8, or by combination thereof can be set for each application. This configuration makes it possible to selectively use the methods of notifying the user, depending on the application being used on the communication apparatus 100. The selective use of the methods of notifying the user means to notify the user, for example, by using vibration in a video viewing application, by using LED light or sound and voice in a game application, and by displaying the signal strength indicator 300 in other applications.

<<1.3. Functional Process>>

Next, a procedure of measurement of the signal strength and display processing will be described with reference to FIG. 9. FIG. 9 is a flowchart illustrating a process of measurement of the signal strength and display processing, according to the present embodiment.

As illustrated in FIG. 9, the measurement unit 140 of the communication apparatus 100 measures the signal strength received (Step S101). When the measured signal strength is equal to or more than the predetermined threshold (Step S102: No), the process returns to Step S101.

On the other hand, when the measured signal strength is lower than the predetermined threshold (Step S102: Yes), it is determined that the signal strength is low, and the notification unit 150 of the communication apparatus 100 notifies the user of the low signal strength (Step S103). As described above, the notification to the user is, for example, display of the signal strength indicator 300, output of text or voice of the predetermined message, output of the sound or vibration with a specific pattern, or blinking of LED light. Whether to perform what kind of notification is determined by the output selection unit 180 of the communication apparatus 100 on the basis of the application being used with displayed on the display unit 160 of the communication apparatus 100.

When the user turns in the spot in response to the notification to the user by the notification unit 150, the measurement unit 140 measures the signal strengths in all directions (Step S104). Note that the signal strength may not necessarily be measured in all directions.

When the measurement of the signal strength is completed, the communication apparatus 100 notifies the user of the direction in which high signal strength is received (Step S105). As described above, the notification here can also be performed by, for example, displaying the signal strength indicator 300, outputting text or voice of the predetermined message, outputting the sound or vibration with a specific pattern, or blinking LED light. The notification method here is also determined by the output selection unit 180 on the basis of the application being used on the communication apparatus 100. After Step S105, the present process ends.

2. Exemplary Hardware Configuration

Next, an exemplary hardware configuration of the communication apparatus 100 according to the present embodiment will be described. FIG. 10 is a block diagram illustrating the exemplary hardware configuration of the communication apparatus 100 according to the present embodiment. Referring to FIG. 10, the communication apparatus 100 includes, for example, a processor 801, ROM 802, RAM 803, a host bus 804, a bridge 805, an external bus 806, an interface 807, an input device 808, an output device 809, a storage 810, a drive 811, a connection port 812, and a communication device 813. Note that the hardware configuration shown here is merely an example, and some of the component elements may be omitted. In addition, a component element other than the component elements shown here may be further included.

(Processor 801)

The processor 801 functions, for example, as an arithmetic processing device or a control device, and controls all or part of the operation of each component element, on the basis of various programs recorded in the ROM 802, the RAM 803, the storage 810, or a removable recording medium 901.

(ROM 802 and RAM 803)

The ROM 802 is a unit that stores a program read by the processor 801, data used for calculation, and the like. The RAM 803 temporarily or permanently stores, for example, a program read by the processor 801, various parameters appropriately changing upon running the program, and the like.

(Host Bus 804, Bridge 805, External Bus 806, and Interface 807)

The processor 801, the ROM 802, and the RAM 803 are connected to each other, for example, via the host bus 804 configured to transmit data at high speed. Meanwhile, the host bus 804 is connected to, for example, the external bus 806 configured to transmit data at a relatively low transmission rate, via the bridge 805. In addition, the external bus 806 is connected to various component elements via the interface 807.

(Input Device 808)

For the input device 808, for example, a mouse, a keyboard, a touch panel, a button, a switch, a lever, and the like are used. Furthermore, for the input device 808, a remote controller configured to transmit a control signal by using infrared ray or another radio wave is sometimes used. Furthermore, the input device 808 includes a voice sound input device such as a microphone.

(Output Device 809)

The output device 809 is a device that is configured to visually or audibly notify the user of acquired information, the device including a display device such as a cathode ray tube (CRT), LCD, or organic EL, an audio output device such as a speaker or headphone, a printer, a mobile phone, or a facsimile. Furthermore, the output device 809 according to the present embodiment includes various vibrating devices that are configured to output tactile stimulation. In addition, the output device 809 is a device, such as a smart speaker, exclusively outputting voice sound, and may have a text to speech (TTS) function of reading out a character string.

(Storage 810)

The storage 810 is a device for storing various data. For the storage 810, for example, a magnetic storage device such as a hard disk drive (HDD), a semiconductor storage device, an optical storage device, a magneto-optical storage device, or the like is employed.

(Drive 811)

The drive 811 is, for example, a device that reads information recorded on the removable recording medium 901 such as a magnetic disk, optical disk, magneto-optical disk, or semiconductor memory, or that writes information in the removable recording medium 901.

(Connection Port 812)

The connection port 812 is a port, such as a universal serial bus (USB) port, an IEEE1394 port, a small computer system interface (SCSI), an RS-232C port, or a port for connecting an externally connected device 902, such as an optical audio terminal.

(Communication Device 813)

The communication device 813 is a communication device that is used for connection to various communication networks such as a mobile network, including the Internet and a mobile phone network by using a centimeter wave or a millimeter wave using a high frequency band, and that is, for example, a wireless LAN, a communication card for a wireless USB (WUSB), a router for optical communication, a modem for various communications, or the like.

(Removable Recording Medium 901)

The removable recording medium 901 is, for example, a DVD medium, a Blu-ray (registered trademark) medium, an HD DVD medium, various semiconductor storage media, and the like. As a matter of course, the removable recording medium 901 may be, for example, an IC card with a non-contact IC chip, an electronic device, or the like.

(Externally Connected Device 902)

The externally connected device 902 includes, for example, a printer, a portable music player, a digital camera, a digital camcorder, or an IC recorder.

3. Conclusion

As described above, the communication apparatus 100 includes the determination unit 130 that determines the direction in which the communication apparatus 100 faces, the measurement unit 140 that measures the signal strength indicating the strength of the radio wave received by the communication apparatus 100, the notification unit 150 that notifies the user of the signal strength falling below the first threshold, and the display unit 160 that superimposes the direction in which the signal strength exceeds the second threshold, as the first display, on the second display being displayed.

This configuration makes it possible to guide the user to turn in the direction in which high signal strength is received, without hindering the UX of the user of the communication apparatus 100 using the high frequency band as much as possible.

Preferred embodiments of the present disclosure have been described above in detail with reference to the accompanying drawings, but the technical scope of the present disclosure is not limited to these examples. A person skilled in the art may obviously find various alternations and modifications within the technical concept described in claims, and it should be understood that the alternations and modifications will naturally come under the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Note that the present technology can also employ the following configurations.

(1)

A communication apparatus including:
  a determination unit that determines a direction in which the communication apparatus faces;
  a measurement unit that measures signal strength indicating strength of a radio wave received by the communication apparatus;
  a notification unit that notifies a user of the signal strength falling below a first threshold; and
  a display unit that superimposes a direction in which the signal strength exceeds a second threshold, as first display, on second display being displayed.

(2)

The communication apparatus according to (1), wherein the display unit further displays a direction in which measurement of the signal strength is completed.

(3)

The communication apparatus according to (1) or (2), wherein the display unit further hides the first display when the communication apparatus is kept facing in the direction in which the signal strength exceeds the second threshold, for a certain time.

(4)

The communication apparatus according to any one of (1) to (3), wherein at least one of the first threshold and the second threshold is determined by an application being used on the communication apparatus.

(5)

The communication apparatus according to any one of (1) to (4), wherein a display position of the first display is set in advance by the user.

(6)

The communication apparatus according to (5), wherein the display position of the first display is set in advance by the user, for each application, and the display unit superimposes the first display on the display position set in advance, based on the second display of the application being displayed on the display unit.

(7)

The communication apparatus according to any one of (1) to (6), further including a vibration unit that vibrates by changing at least one of the strength and pattern of vibration depending on the signal strength.

(8)

The communication apparatus according to (7), further including an output selection unit that selectively determines, based on an application being displayed on the display unit, whether to output notification of the signal strength to the user through the first display by the display unit or through the vibration by the vibration unit.

(9)

A method including:

by a communication apparatus, determining a direction in which the communication apparatus faces;

measuring signal strength indicating strength of a radio wave received by the communication apparatus;

notifying a user of the signal strength falling below a first threshold; and superimposing a direction in which the signal strength exceeds a second threshold, as first display, on second display being displayed.

(10)

A program causing a communication apparatus to perform:

determining a direction in which the communication apparatus faces;

measuring signal strength indicating strength of a radio wave received by the communication apparatus;

notifying a user of the signal strength falling below a first threshold; and superimposing a direction in which the signal strength exceeds a second threshold, as first display, on second display being displayed.

REFERENCE SIGNS LIST

100 COMMUNICATION APPARATUS
110 COMMUNICATION UNIT
120 STORAGE UNIT
130 DETERMINATION UNIT
140 MEASUREMENT UNIT
150 NOTIFICATION UNIT
160 DISPLAY UNIT
170 VIBRATION UNIT
180 OUTPUT SELECTION UNIT
190 CONTROL UNIT
200 BASE STATION
300 SIGNAL STRENGTH INDICATOR
310 ARROW
320 MEASUREMENT COMPLETION RANGE
330 HIGH-STRENGTH RANGE

The invention claimed is:

1. A communication apparatus including:

a display; and control circuitry configured to:

display a first display associated with an application being used on the communication apparatus, while displaying the first display:

monitor a signal strength associated with the application, upon detecting that the signal strength associated with the application has dropped below a first predetermined threshold, automatically display a signal strength compass as a second display in a predetermined and moveable position on top of the first display, with a north position of the signal strength compass corresponding to a direction that a rear side of the communication apparatus is facing, and while a user is moving the communication apparatus in a circle in a horizontal plane:

update the north position of the signal strength compass to correspond to a current direction that the rear side of the communication apparatus is facing, measure a directional signal strength associated with application in the current direction that the rear side of the communication apparatus is facing, display a progress bar on a perimeter of the circle corresponding movement of the communication apparatus in the circle in the horizontal plane, superimpose, on the signal strength compass, information indicating a sector of the signal strength compass corresponding to a direction in which the measured directional signal strength exceeds a second predetermined threshold, wherein the sector comprises an arc of 45 degrees or less.

2. The communication apparatus according to claim 1, wherein the control circuitry controls the display to hide the signal strength compass when the communication apparatus is kept, for a predetermined time, facing in the direction in which the measured directional signal strength exceeds the second threshold.

3. The communication apparatus according to claim 1, wherein at least one of the first threshold and the second threshold is determined by the application being used on the communication apparatus.

4. The communication apparatus according to claim 1, wherein the predetermined and moveable position on top of the first display is set in advance by the user.

5. The communication apparatus according to claim 1, further including a vibrator that vibrates with at least one of a vibration strength or a vibration pattern of that corresponds to the measured directional signal strength.

6. A method performed by a communication apparatus having a display and control circuitry, the method comprising:

displaying a first display associated with an application being used on the communication apparatus, while displaying the first display:

monitoring a signal strength associated with the application, upon detecting that the signal strength associated with the application has dropped below a first predetermined threshold, automatically displaying a signal strength compass as a second display in a predetermined and moveable position on top of the first display, with a north position of the signal strength compass corresponding to a direction that a rear side of the communication apparatus is facing, and while a user is moving the communication apparatus in a circle in a horizontal plane:

updating the north position of the signal strength compass to correspond to a current direction that the rear side of the communication apparatus is facing, measuring a directional signal strength associated with application in the current direction that the rear side of the communication apparatus is facing, displaying a progress bar on a perimeter of the circle corresponding movement of the communication apparatus in the circle in the horizontal plane, superimposing, on the signal strength compass information indicating a sector of the signal strength compass corresponding to a direction in which the measured directional signal strength exceeds a second predetermined threshold, wherein the sector comprises an arc of 45 degrees or less.

7. A non-transitory computer product containing instructions that cause a communication apparatus to perform a method, the method comprising:

displaying a first display associated with an application being used on the communication apparatus, while displaying the first display:

monitoring a signal strength associated with the application, upon detecting that the signal strength associated with the application has dropped below a first predetermined threshold, automatically displaying a signal strength compass as a second display in a predetermined and moveable position on top of the first display, with a north position of the signal strength compass corresponding to a direction that a rear side of the communication apparatus is facing, and while a user is moving the communication apparatus in a circle in a horizontal plane:

updating the north position of the signal strength compass to correspond to a current direction that the rear side of the communication apparatus is facing, measuring a directional signal strength associated with application in the current direction that the rear side of the communication apparatus is facing, displaying a progress bar on a perimeter of the circle corresponding movement of the communication apparatus in the circle in the horizontal plane, superimposing, on the signal strength compass, information indicating a sector of the signal strength compass corresponding to a direction in which the measured directional signal strength exceeds a second predetermined threshold, wherein the sector comprises an arc of 45 degrees or less.

\* \* \* \* \*